Oct. 2, 1928.

A. BOLLERMAN 1,685,977

WIRE CUTTER AND STRIPPER

Filed Aug. 18, 1927

INVENTOR.
Albert Bollerman
BY
Hervey Barber & McKee
ATTORNEYS.

Patented Oct. 2, 1928.

1,685,977

UNITED STATES PATENT OFFICE.

ALBERT BOLLERMAN, OF NEW YORK, N. Y.

WIRE CUTTER AND STRIPPER.

Application filed August 18, 1927. Serial No. 213,779.

This invention relates to implements for stripping insulation from wires as used in electrical apparatus and cutting the same as may be desired.

It is one of the objects of this invention to provide a compact, simple, and easily operated implement that can be conveniently carried about and operated in an effective manner.

A further feature is in the provision of a tool which is adjustable to suit varying diameters of wire and which may be easily operated by one hand only.

A further object is to provide a tool in which the cutting and scarifying blades may be removed as occasion requires, as for resharpening, etc.

These and other like objects are accomplished by the novel construction and combination of parts hereinafter described and shown in the accompanying drawing, forming a material part of this disclosure, and in which:—

Figure 1:
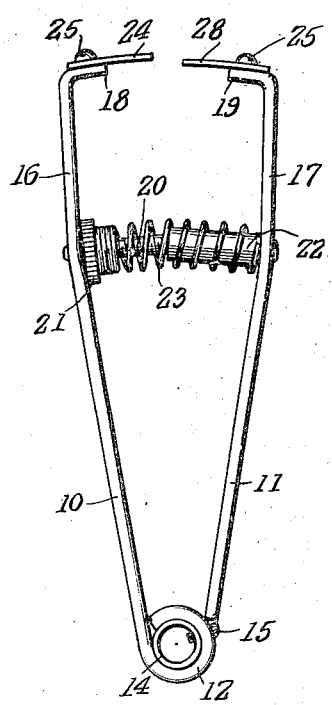
Fig. 1 is a side elevational view of an implement made in accordance with the invention, shown in an open position.
Figure 2:
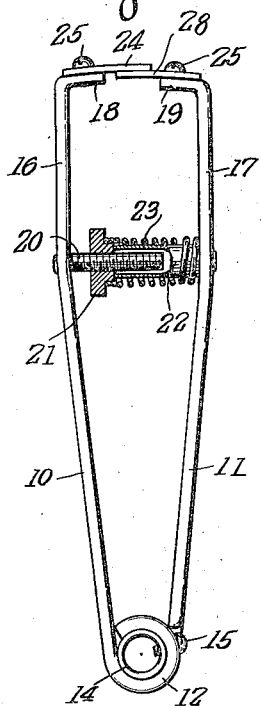
Fig. 2 is a similar view of the same, but in a closed position, parts being broken away in order to disclose the construction.
Figure 3:
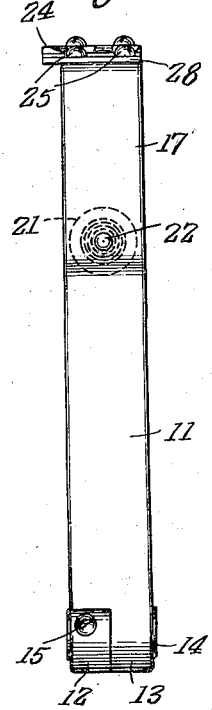
Fig. 3 is a side elevational view taken in a plane at right angles to Figs. 1 and 2.
Figure 4:
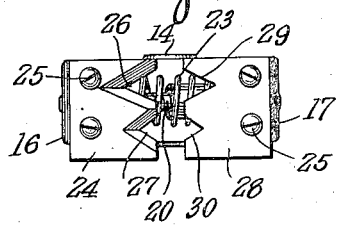
Fig. 4 is a plan view of the device looking from its operative end and shown in an open position.
Figure 5:
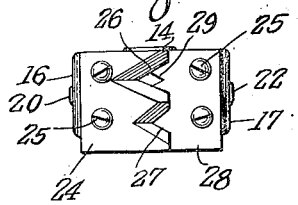
Fig. 5 is a similar view of the same but shown in a closed position.

The simplicity of the implement is readily observable from inspection of the drawing, which shows the same to be comprised of two side elements 10 and 11, each of which is curled at their meeting ends and cut across to present two equal hinge-like portions 12 and 13, which are coiled about a tubular rivet 14, being held in operative relation by the offset or flanged ends of the rivet.

Set in one of the elements, as 12, is a stop 15, as the screw shown, the head of which limits the amount of separation attainable between the members.

The divergent members 10 and 11 are continued to form parallel members 16 and 17 which are inturned as at 18 and 19 to form shelf-like flanges.

It will be noticed that the side members are of substantially rectangular cross section, with rounded outer edges forming together a convenient grip handle as manipulated by an operator.

Fixed in the member 10 is a screw stud 20 extending inwardly toward the opposite side and adjustably mounted on the stud is a knurled nut 21. On the opposite member 11 is similarly attached a hollow post 22 around which is coiled a compression spring 23, one end abutting the member 11 and the other the nut 21, the normal effect of the spring being to separate the two handle-like elements to the limit of the stop screw 15.

It is to be noted that the hollow part 22 not only receives the stud 20, but its end makes contact with the adjacent side of the nut 21, thus providing a positive adjustment for the closing movement of the handles.

Fixed on the shelf-like flange 18 is a shear blade 24 held in rigid engagement by screws 25, this blade laterally overhanging the shelf as shown and having its inner edges provided with beveled V-shaped notches 26 and 27, the latter being the smaller and the inner surface of the blade being level and smooth.

A similar but reversed shear blade 28 is secured on the opposite flange, and is provided at its front edge with notches 29 and 30, the blade having a level outer surface and being operative with respect to the opposed blade in the manner of a shear.

In operation the elements 10 and 11 are grasped in the hand of the operator, the spring 23 acting to spread the members and an insulated wire entered between either of the pair of openings 26 and 27, or 29 and 30, according to its size, whereupon the handle is closed to the limit of adjustment of the nut 21 and the wire drawn longitudinally through the selected openings removing the surrounding insulation.

The nut 21 may be so adjusted that one side of the implement can be used for stripping the insulation and the other smaller opening may be adjusted to separate the wire at any desired point along its length.

As the implement is normally held in an expanded, open position, and conveniently operated in the manner specified, it will be obvious that a desirable tool for the purpose set forth has been disclosed.

Although the foregoing is descriptive of the preferred form of my invention, it will be apparent that minor changes may be made in its structural features without departing from the spirit and scope of the claim hereto appended.

Having thus described my invention, what I claim as new and desire to secure by Letters Patent, is:—

A wire cutting and stripping implement comprising a pair of handles hinged together at one end and having inturned flanges at the other, cutting and stripping devices attached in opposed relation to said flanges, a screw stud fixed in one handle to extend towards the other, a hollow post fixed in the other handle to receive said stud, a nut adjustable on said stud, to limit the closing movement of the handles, a compression spring encircling said stud to normally press said handles apart, and a stop limiting the opening between said handles.

In testimony whereof I have hereunto affixed my signature.

ALBERT BOLLERMAN.